(12) United States Patent
Wang et al.

(10) Patent No.: US 6,284,217 B1
(45) Date of Patent: Sep. 4, 2001

(54) METHOD AND CATALYST STRUCTURE FOR STEAM REFORMING OF A HYDROCARBON

(75) Inventors: Yong Wang; David P. Vanderwiel, both of Richland; Anna Lee Y. Tonkovich, Pasco, all of WA (US)

(73) Assignee: Battelle Memorial Institute, Richland, WA (US)

( * ) Notice: Subject to any disclaimer, the term of this patent is extended or adjusted under 35 U.S.C. 154(b) by 0 days.

(21) Appl. No.: 09/375,615

(22) Filed: Aug. 17, 1999

(51) Int. Cl.[7] ............................... C01B 3/26; C01B 3/32
(52) U.S. Cl. .................. 423/651; 423/418.2; 252/373; 518/702
(58) Field of Search ................ 208/130; 252/373; 518/700, 702; 423/418.2, 651; 48/214 A

(56) References Cited

U.S. PATENT DOCUMENTS

| | | |
|---|---|---|
| 3,880,776 | 4/1975 | Box, Jr. et al. ................ 252/466 |
| 3,904,553 | 9/1975 | Campbell et al. .............. 252/465 |
| 3,926,583 * | 12/1975 | Rostrup-Nielsen ............. 48/214 |
| 4,088,608 * | 5/1978 | Tanaka et al. ................ 252/466 PT |
| 4,442,024 | 4/1984 | Crone, Jr. ..................... 502/334 |
| 4,522,937 | 6/1985 | Yoo et al. ..................... 502/302 |
| 4,678,600 * | 7/1987 | Stahl et al. ................... 252/373 |
| 4,727,052 | 2/1988 | Wan et al. .................... 502/327 |
| 4,740,290 * | 4/1988 | Tomita et al. ................. 208/67 |
| 4,963,520 | 10/1990 | Yoo et al. ..................... 502/64 |
| 5,112,527 * | 5/1992 | Kobylinski .................... 252/373 |
| 5,235,121 | 8/1993 | Brinkmeyer et al. ........... 585/402 |
| 5,399,537 * | 3/1995 | Bhattacharyya et al. ....... 502/84 |

FOREIGN PATENT DOCUMENTS 2105253  9/1971  (FR).
1003147  10/1962  (GB).

* cited by examiner

Primary Examiner—Bekir L. Yildirim
(74) Attorney, Agent, or Firm—Paul W. Zimmerman

(57) ABSTRACT

The present invention includes an improvement to the existing method of steam reforming of hydrocarbon, wherein the improvement comprises: the flowing is at a rate providing a residence time less than about 0.1 sec resulting in obtaining product formation yield or amount that is the same or greater compared to product formation at a longer residence time. Another improvement of the present invention is operation at a steam to carbon ratio that is substantially stoichiometric and maintaining activity of the supported catalyst. The present invention also includes a catalyst structure for steam reforming of a hydrocarbon.

21 Claims, 1 Drawing Sheet

METHOD AND CATALYST STRUCTURE FOR STEAM REFORMING OF A HYDROCARBON

FIELD OF THE INVENTION

The present invention is a method and catalyst structure for steam reforming of a hydrocarbon.

BACKGROUND OF THE INVENTION

Steam reforming of hydrocarbons is commonly used for feedstock production for carbon-monoxide hydrogenation (Fischer-Tropsch synthesis), methanol synthesis and hydrogen production. Steam reforming is done commercially by flowing a mixture of steam and the hydrocarbon past a supported catalyst having an alumina support and a catalyst metal thereon, and reacting the mixture at a temperature from about 600° C. to about 1000° C., forming at least one product. Research has been done with the catalyst metal on a spinel support. Residence times are typically on the order of seconds and steam tocarbon ratio greater than about 2.5. For steam to carbon ratio less than 2.5, catalyst activity is generally degraded after hours to days due to coke formation and the supported catalyst must be refreshed or replaced.

The rate of supported catalyst activity degradation has been reduced by use of excess steam (steam to carbon ratio greater than 2.5). Excess steam, however, requires excess thermal energy and results in large system pressure drop. Using less steam results in faster degradation of catalyst activity because of coking from the hydrocarbon(s).

Hence, there is a need for a method of steam reforming of a hydrocarbon that provides greater product yield and permits using less steam and maintaining catalytic activity of the catalyst.

SUMMARY OF THE INVENTION

The present invention includes an improvement to the existing method of steam reforming of hydrocarbon, wherein the improvement comprises:

the flowing is at a rate providing a residence time less than about 0.1 sec resulting in obtaining product formation yield or amount that is the same or greater compared to product formation at a longer residence time. Another improvement of the present invention is operation at a steam to carbon ratio that is substantially stoichiometric and maintaining activity of the supported catalyst.

The present invention also includes a catalyst structure for steam reforming of a hydrocarbon. The catalyst structure has (a) a first porous structure with a first pore surface area and a first pore size of at least about 0.1 $\mu$m;

(b) a porous interfacial layer that is a spinel with a second pore surface area and a second pore size less than the first pore size, the porous interfacial layer having a thickness less than 4 mm placed upon the first pore surface area;

(c) a steam reforming catalyst selected from the group consisting of rhodium, iridium, nickel, palladium, platinum, carbide of group VIb and combinations thereof placed upon the second pore surface area.

It is an object of the present invention to provide a method of steam reforming of hydrogen with a residence time of less than about 0.1 sec.

It is an object of the present invention to provide a catalyst structure with a porous interfacial layer of spinel.

The subject matter of the present invention is particularly pointed out and distinctly claimed in the concluding portion of this specification. However, both the organization and method of operation, together with further advantages and objects thereof, may best be understood by reference to the following description taken in connection with accompanying drawings wherein like reference characters refer to like elements.

DESCRIPTION OF THE PREFERRED EMBODIMENT(S)

The present invention includes a method for steam reforming of a hydrocarbon having the steps of flowing a mixture of steam and the hydrocarbon past a supported catalyst having a support and a catalyst metal thereon. The mixture is reacted at a temperature from about 600° C. to about 1000° C. forming at least one product. The improvement of the present invention is using a spinel support and flowing the mixture at a rate providing a residence time less than about 0.1 sec and obtaining product formation that is the same or greater than that obtained at longer residence times.

Also, under the previously described conditions, catalytic activity is degraded when the steam to carbon ratio is substantially stoichiometric. Another improvement of the present invention realized by flowing the mixture at a rate providing a residence time less than about 0.1 sec is maintaining activity of the spinel supported catalyst beyond 6 hours without degradation by coking even for substantially stoichiometric steam to carbon ratio. Substantially stoiciometric is a steam to carbon content ratio greater than about 0.9 and less than about 2.5, preferably from about 0.98 to about 2.

The supported catalyst may be in the form of a powder of non-porous particles, porous solid and combinations thereof.

Hydrocarbon includes oxygenates, alkanes, alkenes, alkynes, branched isomers, aromatics, saturated and unsaturated hydrocarbons and combinations thereof including fuels such as gasoline, kerosere, diesel, JP-8.

EXAMPLE 1

An experiment was conducted to demonstrate the present invention. The supported catalyst was spinel of a gamma-alumina ($\gamma$-$Al_2O_3$) support with a magnesia (MgO) passivation layer and rhodium oxide ($Rh_2O_3$). The approximate composition was about 15 wt% $Rh_2O_3$, about 5 wt% MgO, and about 80 wt% $\gamma$-$Al_2O_3$. The supported catalyst was prepared by (1) calcining a high surface area $\gamma$-$Al_2O_3$ at 500° C. for 5 hours; (2) impregnating the $\gamma$-$Al_2O_3$ with MgO using the incipient wetness technique with a solution of magnesium nitrate; and obtaining an MgO modified $\gamma$-$Al_2O_3$ support; (3) drying the modified support at 110° C. for 4 hours followed by (4) a second calcination at 900° C. for 2 hours; (5) impregnating the modified support with $Rh_2O_3$ with the incipent wetness technique from a rhodium nitrate solution; (6) followed by a final drying 110° C. for 4 hours and a (7) a final calcination at 500° C. for 3 hours to obtain a powder of the supported catalyst.

A microreactor was constructed of a quartz tube with 4 mm ID and 6.35 mm OD. About 0.2 g of powder of supported catalyst was placed in the microreactor in a packed bed arrangement.

Reactants were steam and methane in a steam to carbon ratio of approximately 1 which is stoichiometric within measurement uncertainty. Reactants were flowed through the reactor at temperatures from 650° C. to 900° C.

Figure 1:
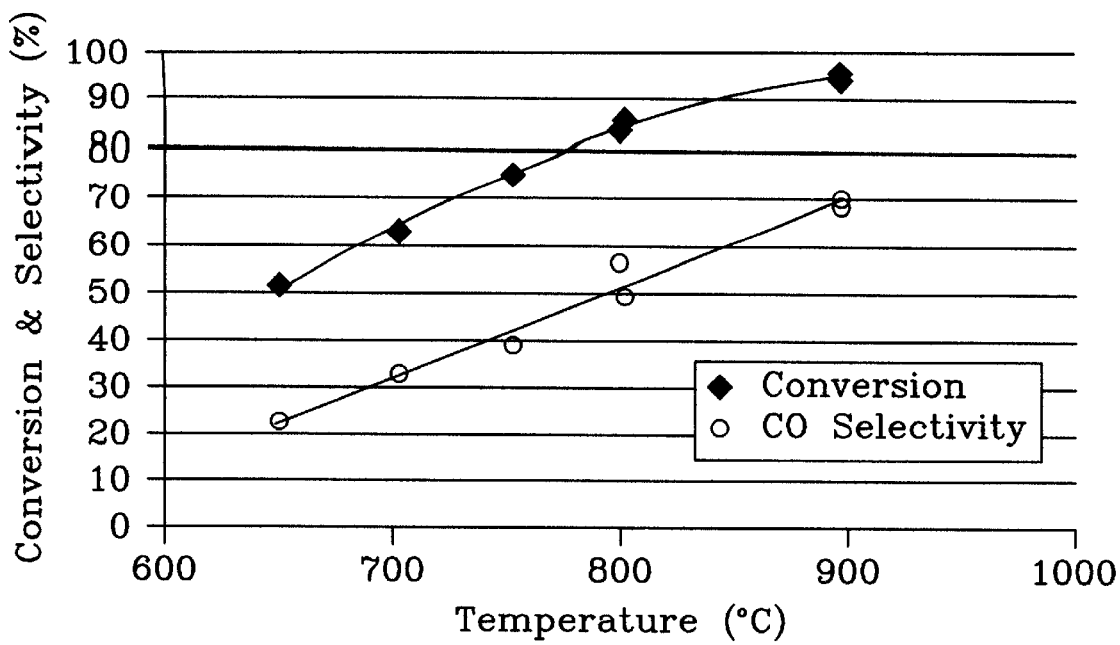
FIG. 1 is a graph of conversion and selectivity versus temperature.

Results are shown in FIG. 1 for a steam to carbon ratio of 3 with conversion ranging from about 52% to 95% with increasing temperature and selectivity ranging from 22% to 70%.

Figure 2:
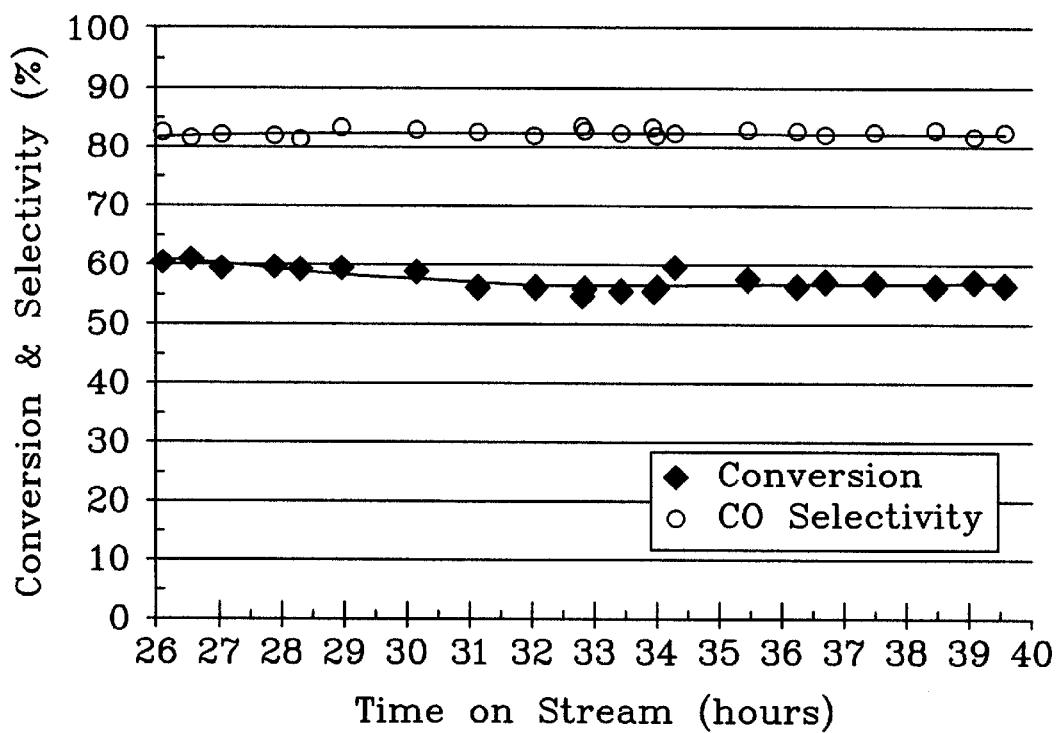
FIG. 2 is a graph of conversion and selectivity versus time.

Results in FIG. 2 are for a steam to carbon ratio of 1 at 900° C. over 40 hours. No degradation of the supported catalyst was observed. Electron microscopic examination after testing revealed no coke deposition and BET measurements detected no significant loss in surface area.

CLOSURE

While a preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

We claim:

1. A method for steam reforming of a hydrocarbon comprising:
   reacting a mixture of steam and a hydrocarbon over a supported catalyst at a temperature from about 650° C. to about 900° C.;
   wherein said supported catalyst comprises a spinel support and a catalyst metal;
   wherein said step of reacting a mixture of steam and a hydrocarbon is conducted at a residence time of less than about 0.1 second; and
   wherein said step of reacting results in at least about 50% of hydrocarbon conversion and a CO selectivity of less than about 70%.

2. The method of claim 1 wherein said catalyst metal is selected from the group consisting of rhodiun, iridium, nickel, palladium, platinum, carbide of group VIb, and combinations thereof.

3. The method of claim 2 wherein the steam to carbon ratio is from 0.9 to 2.5.

4. The method of claim 2 wherein the hydrocarbon is a fuel selected from the group consisting of gasoline, diesel and JP-8.

5. The method of claim 2 wherein the hydrocarbon is a selected from the group consisting of alkanes, alkenes, alkynes, branched isomers, aromatics, saturated and unsaturated hydrocarbons, and combinations thereof.

6. The method of claim 2 wherein said step of reacting results in about 50–95% of hydrocarbon conversion and a CO selectivity of about 20–70%.

7. The method of claim 6 wherein the support comprises a magnesia passivation layer.

8. The method of claim 6 wherein said support is made by a method comprising impregnating alumina with a solution containing magnesium.

9. The method of claim 8 wherein said catalyst metal comprises rhodium.

10. The method of claim 9 wherein said mixture of steam and hydrocarbon comprises water and methane.

11. The method of claim 2 wherein said mixture of steam and hydrocarbon consists of water and methane.

12. A method for steam reforming of a hydrocarbon comprising:
    reacting a mixture of steam and a hydrocarbon over a supported catalyst at a temperature from about 600° C. to about 1000° C.;
    wherein said supported catalyst comprises a spinel support and a catalyst metal;
    wherein said step of reacting a mixture of steam and a hydrocarbon is conducted at a residence time of less than about 0.1 second;
    wherein said mixture of steam and hydrocarbon has a steam to carbon ratio of greater than about 0.9 and less than 2.5;
    wherein said method is continuously conducted for over 40 hours; and
    wherein between about 26 hours time-on-stream and about 40 hours time-on-stream, the CO selectivity remains essentially unchanged and the hydrocarbon conversion changes less than about 5%.

13. The method of claim 12 wherein the steam to carbon ratio is from 0.98 to 2, and
    wherein said catalyst metal is selected from the group consisting of rhodium, iridium, nickel, palladium, platinum, carbide of group VIb, and combinations thereof.

14. The method of claim 13 wherein the hydrocarbon is a fuel selected from the group consisting of gasoline, diesel and JP-8.

15. The method of claim 13 wherein the hydrocarbon is a selected from the group consisting of oxygenates, alkanes, alkenes, alkynes, branched isomers, aromatics, saturated and unsaturated hydrocarbons, and combinations thereof.

16. The method of claim 13 wherein, after 40 hours of operation, electron microscopy shows no coke deposits on the catalyst and BET measurements detect no significant loss in surface area.

17. The method of claim 12 wherein the support comprises a magnesia passivation layer.

18. The method of claim 13 wherein said support is made by a method comprising impregnating alumina with a solution containing magnesium.

19. The method of claim 18 wherein said catalyst metal comprises rhodium.

20. The method of claim 19 wherein said mixture of steam and hydrocarbon comprises water and methane.

21. The method of claim 20 wherein said mixture of steam and hydrocarbon consists of water and methane.

* * * * *

(12) EX PARTE REEXAMINATION CERTIFICATE (9452nd)
United States Patent
Wang et al.

(10) Number: US 6,284,217 C1
(45) Certificate Issued: Dec. 20, 2012

(54) METHOD AND CATALYST STRUCTURE FOR STEAM REFORMING OF A HYDROCARBON

(75) Inventors: Yong Wang, Richland, WA (US); David P. Vanderwiel, Richland, WA (US); Anna Lee Y. Tonkovich, Pasco, WA (US)

(73) Assignee: Battelle Memorial Institute, Richland, WA (US)

Reexamination Request:
No. 90/011,278, Oct. 11, 2010

Reexamination Certificate for:
Patent No.: 6,284,217
Issued: Sep. 4, 2001
Appl. No.: 09/375,615
Filed: Aug. 17, 1999

(51) Int. Cl.
*C01B 3/26* (2006.01)
*C01B 3/32* (2006.01)
(52) U.S. Cl. ............ 423/651; 423/418.2; 252/373; 518/702

(58) Field of Classification Search .............. None
See application file for complete search history.

(56) References Cited

To view the complete listing of prior art documents cited during the proceeding for Reexamination Control Number 90/011,278, please refer to the USPTO's public Patent Application Information Retrieval (PAIR) system under the Display References tab.

*Primary Examiner* — Timothy Speer

(57) ABSTRACT

The present invention includes an improvement to the existing method of steam reforming of hydrocarbon, wherein the improvement comprises: the flowing is at a rate providing a residence time less than about 0.1 sec resulting in obtaining product formation yield or amount that is the same or greater compared to product formation at a longer residence time. Another improvement of the present invention is operation at a steam to carbon ratio that is substantially stoichiometric and maintaining activity of the supported catalyst. The present invention also includes a catalyst structure for steam reforming of a hydrocarbon.

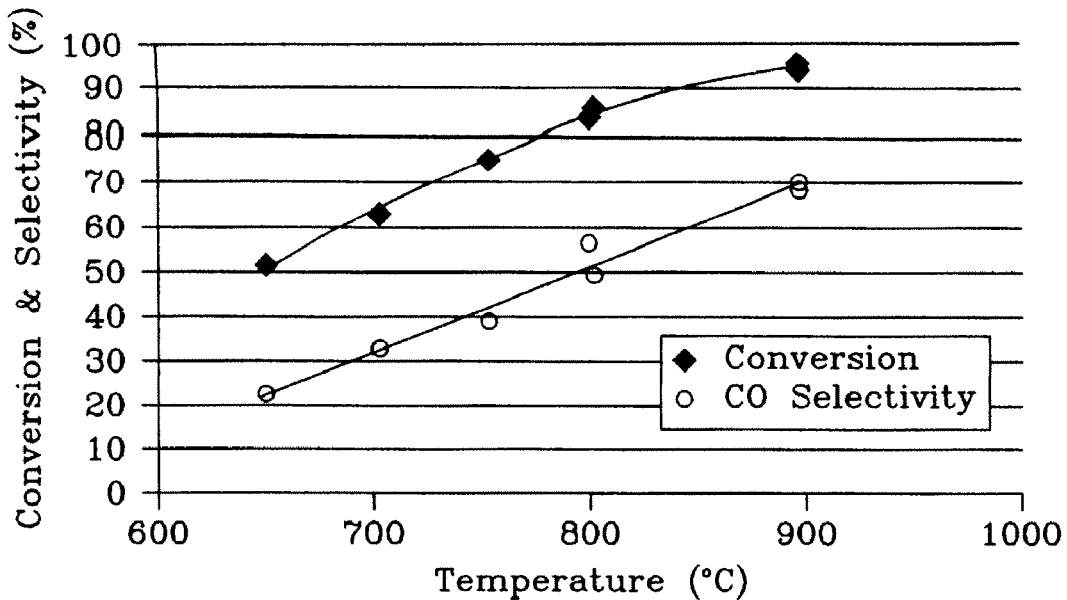

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1-21 is confirmed.

* * * * *